Patented Oct. 23, 1945

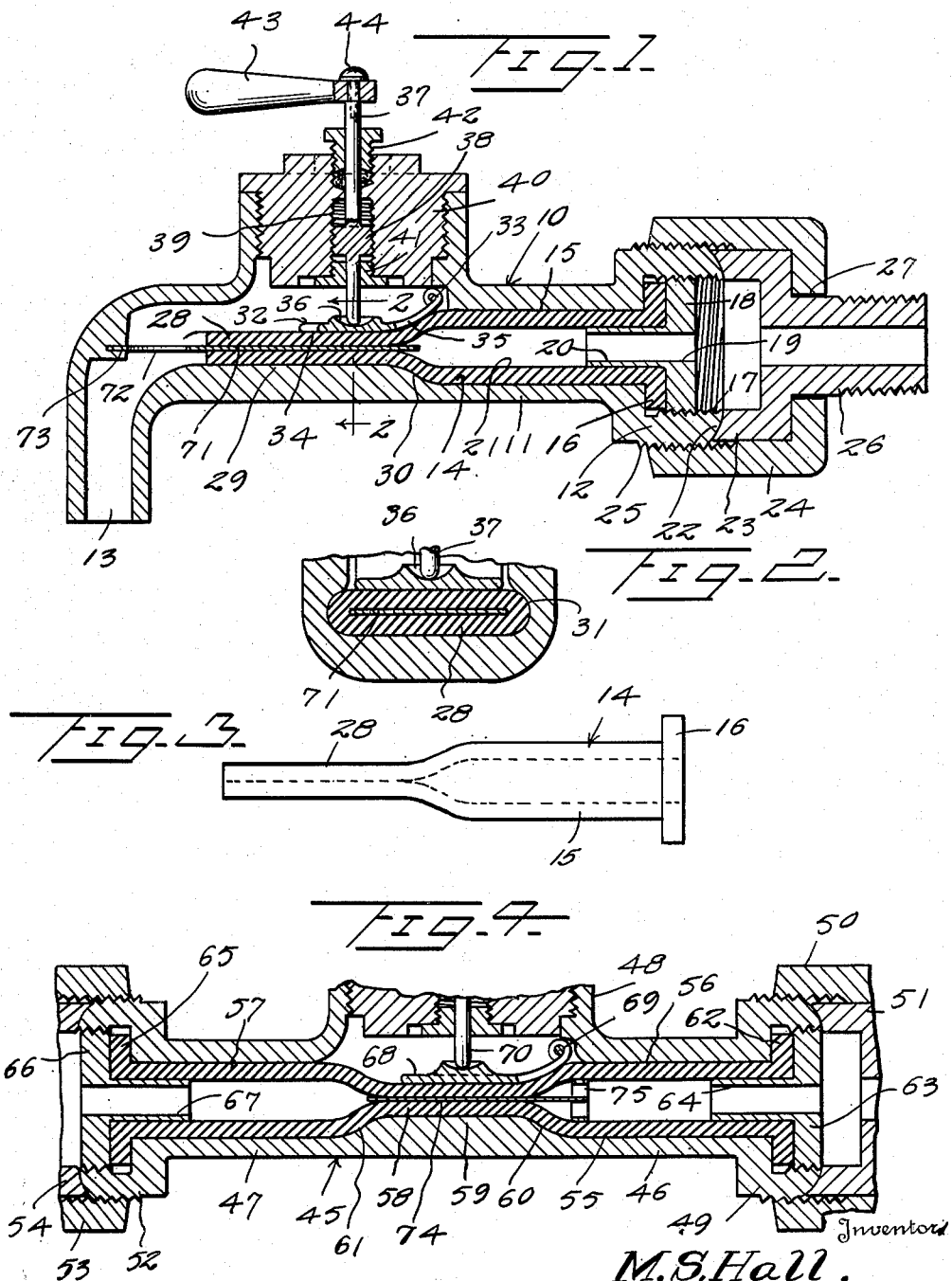

2,387,660

UNITED STATES PATENT OFFICE 2,387,660

PLUGLESS VALVE

Mora S. Hall, Brentwood, and Alfred B. Bornstein and William Bornstein, Takoma Park, Md.

Application March 28, 1944, Serial No. 528,428

3 Claims. (Cl. 251—5)

This invention relates to fluid regulating devices and more particularly to valves.

An object of this invention is to provide a plugless valve, such as a spigot or interposed valve wherein the conventional seat and plug are eliminated, the flow of the fluid being regulated by a compressible regulator.

Another object of this invention is to provide a valve of this kind in which the regulator is in the form of a rubber or flexible sleeve having a portion thereof molded or otherwise shaped to closed position so that the sleeve will not be distorted when in closed position. Upon release of pressure on the sleeve, it will expand by pressure of fluid on the intake side thereof.

With the foregoing objects and others which may hereinafter appear, the invention consists of the novel construction, combination and arrangement of parts as will be more specifically referred to and illustrated in the accompanying drawing, wherein is shown an embodiment of the invention, but it is to be understood that changes, modifications, and variations of the invention may be resorted to which fall within the scope of the invention as claimed.

In the drawing:

Figure 1 is a longitudinal section of a plugless valve connected according to an embodiment of this invention;

Figure 2 is a fragmentary sectional view taken on the line 2—2 of Figure 1;

Figure 3 is a detailed side elevation of the regulating sleeve removed from the housing, and Figure 4 is a longitudinal section of a modified form of this invention.

Referring to the drawing and first to Figs. 1 to 3, the numeral 10 designates generally a housing which is formed of an elongated cylindrical body 11 having an enlarged cylindrical flange 12 in the intake end thereof and a downwardly opening outlet end or nozzle 13. The body 11 of the housing 10 has mounted therein a compressible, fluid-regulating sleeve generally designated as 14. The regulating sleeve 14 comprises a cylindrical body 15 having an annular flange 16 at the intake end thereof, and the cylindrical flange 12 of the housing is formed with interior threads 17 within which a nut 18 engages, the nut binding the flange 16 against the inner end of the cylindrical flange 12. The nut 18 is formed with a circular opening 19, and a sleeve or nipple 20 extends from the nut 18 interiorly of the bore 21 of the sleeve 14.

The cylindrical flange 12 is provided with a seat 22 at its rear or intake end against which the outer end of a coupling member 23 is adapted to engage. The coupling member 23 is held onto the seat 22 by means of a threaded nut 24 which engages exterior threads 25 carried by the flange 12, and a nipple 26 extends through the bore 27 of the nut 24, so that the housing 10 may be coupled to a source of fluid pressure supply. The regulating member 14 also includes a normally closed forward portion 28 which on the lower side thereof is adapted to engage on a seat 29 which is formed at the lower portion of the body 11. The seat 29 at its rear or intake end tapers downwardly as indicated at 30 so that the regulating member 14 will snugly rest on the seat 29 and the inclined rear portion 30 when in either opened or closed position. In order to provide means whereby the compressed or discharge end of the sleeve 14 will be substantially encompassed when the latter is in closed position, the housing 10 is formed with laterally disposed and longitudinally extending, confronting recesses 31 as shown in Fig. 2.

The regulating member 14 is adapted to be closed by means of a pressure plate 32 which is pivotally mounted on a pivot member 33 carried by the housing 10. The pressure plate 32 includes a relatively straight portion 34 and an upwardly curved or inclined portion 35, which substantially conforms to the shape of the regulating member 14 at the point where the cylindrical body 15 is molded to the flattened forward portion 28. The plate 32 is provided with a concave seat 36 on the upper side thereof, and the lower end of a closing pin or stem 37 is adapted to engage on the seat 36. The pin or stem 37 is provided intermediate the ends thereof with an enlarged threaded body 38 which is threaded into a circular opening 39 formed in a plug 40. The lower end of the pin or stem 37 extends through a lower gland or nut 41 which is threaded into the lower end of the bore 39, and the upper portion of the pin or stem 37 engages through a gland 42 which is threaded into the upper end of the plug 40. A handle or operator 43 is secured by fastening means 44 to the upper or outer end of the pin or stem 37. Rotation of the handle 43 to move the stem 37 inwardly will force the pin or stem 37 to rock the plate 32 downwardly or inwardly against the regulating member 14 so as to thereby move the forward portion 28 thereof to closed position.

Referring now to Fig. 4, there is disclosed a slightly modified form of this invention. In this modified form there is disclosed a housing generally designated as member 45, which includes axially aligned, cylindrical nipples 46 and 47 and an upstanding cylindrical bushing 48. The nipple 46 constitutes the intake nipple or end of the housing 45 and is formed in a manner similar to the intake end of the cylindrical member 11. In other words, the nipple 46 is provided with a cylindrical coupling member 49 on which a rotatable nut 50 is threaded for tightly securing a sealing flange 51 against the rear end of the annular flange 49. The nipple 47 is formed with a cylindrical flange 52, and a nut 53 is threaded about the flange 52 and tightly secures sealing member 54 against the adjacent or forward end of the flange 52.

The housing 45 has mounted therein a tubular, regulating member generally designated as 55. The regulating member 55 includes a pair of cylindrical bodies 56 and 57 positioned in the nipples 46 and 47, respectively, and also includes a normally compressed, intermediate portion 58 which seats on an elongated seat 59 formed in the housing 45 between the nipples 46 and 47. The seat 59 at the intake end thereof is tapered as at 60 and at the discharge end thereof is tapered as at 61. The tapers 60 and 61 provide the means whereby the housing 45 will conform to the normal configuration of the regulating member 55. The cylindrical body 56 snugly engages within the nipple 46 and is formed at its rear end with an annular flange 62 which is tightly held against the forward end of the flange 49 and the nipple 46 by means of a nut 63 threaded inside the cylindrical flange 49. A sleeve 64 is carried by the nut 63 and extends forwardly inside the bore of the body 56. The opposite end of the regulating member 55 is formed with an annular flange 65 bearing against the forward end of the nipple or body 47 and tightly secured thereagainst by means of a nut 66 threaded inside the cylindrical flange 52. A sleeve 67 is carried by the nut 66 and extends rearwardly inside the body 57.

The intermediate compressible portion 58 of the regulating member 55 is held in closed and compressed position by means of a pressure plate 68, similar to pressure plate 32, which is pivotally mounted on a pivot 69 carried by the housing 45. The pressure plate 68 is moved toward closing position by means of an endwise movable pin or stem 70 similar in every detail to the pin or stem 37. The modified form of this valve, shown in Fig. 4, may be used as an interposed cut-off valve in a fluid pipe. With the modified form of the valve, the fluid may enter the valve housing from either end.

In the use and operation of this valve, the housing 10 is connected by means of the coupling member 26 to a source of fluid supply, and when in closed position the regulating member 14 will be in the position shown in Figs. 1 and 2. When it is desired to open the valve, the stem 37 is rotated counter-clockwise, thereby relieving pressure on the plate 32, and the fluid pressure in the body 15 will expand the normally compressed portion 28 thereby permitting the fluid to flow through the regulating member 14 for discharge from the nozzle 13.

The regulating members 14 and 55 are preferably made out of rubber or other suitable material which may be readily compressed and will hold the desired fluid. In view of the fact that this valve eliminates the normal or usual valve seat and valve plug, the usual grinding operations to grind the plug to the seat will be eliminated, and it is not necessary to regrind or reshape any portion of the valve after it has been in use for a period of time. If the valve should leak due to the breaking down of the regulating member 14 or the regulating member 55, a new regulating member may be inserted in the housing, whereupon the valve will function in the same manner as when first produced. This valve can be manufactured at small cost and due to its simplicity will not get out of order very quickly and can be repaired very easily by replacing the worn or leaking regulator. The replacement of the damaged or leaking regulator can be made with ordinary wrenches or tools.

In order to provide a means whereby the confronting flat sides of the sealing portion 28 may be prevented from sticking or vulcanizing together, a thin membranous sheet 71 is interposed between the flat sides of the sealing portion. This sheet 71 may be made out of metal, plastic or other material which will inherently resist sticking or vulcanizing. The sheet 71 is provided at its forward end with a narrow stem 72 which is mounted in a boss 73 carried by the housing 10.

In the form shown in Figure 4 the intermediate sealing portion 58 has interposed between the flat sides a thin sheet 74 which is secured to a ring 75. Ring 75 is positioned within cylindrical body 56 and is held against movement to the left by seat 59.

What is claimed is:

1. A plugless valve comprising a housing, a distortable tubular member in said housing, an annular flange at one end of said member, a centrally apertured nut threaded into one end of said housing and bearing against said flange to snugly bind the latter in said housing, a nipple carried by said nut extending into the adjacent end of said member, a seat fixedly carried by said housing, a pressure plate pivotally carried by said housing, adjustable pressure applying means engageable with said plate, and a flat plate projecting into said member and having such a length that one end thereof will be free from confronting surfaces of said member when the latter is in closed position whereby the fluid pressure on the inlet side of said member will act to free the surfaces of the latter from said flat plate.

2. A plugless valve as set forth in claim 1 wherein the opposite end of said flat plate is fixed relative to said housing and is formed with an aperture through which the fluid is adapted to pass.

3. A plugless valve as set forth in claim 1, including a ring fixed to said one end of said flat plate for holding the latter against endwise movement in one direction.

MORA S. HALL.
ALFRED B. BORNSTEIN.
WILLIAM BORNSTEIN.